US009572101B2

(12) United States Patent
Kamijoh et al.

(10) Patent No.: US 9,572,101 B2
(45) Date of Patent: Feb. 14, 2017

(54) OPTIMIZATION OF MOBILE PHONE SERVICE DURING POWER FAILURE

(71) Applicant: INTERNATIONAL BUSINESS MACHINES CORPORATION, Armonk, NY (US)

(72) Inventors: Kohichi Kamijoh, Kanagawa-ken (JP); Hitomi Takahashi, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 143 days.

(21) Appl. No.: 14/209,657

(22) Filed: Mar. 13, 2014

(65) Prior Publication Data
US 2015/0264644 A1    Sep. 17, 2015

(51) Int. Cl.
*H04Q 7/10*    (2006.01)
*H04W 52/02*    (2009.01)
(Continued)

(52) U.S. Cl.
CPC ......... *H04W 52/0206* (2013.01); *H04W 24/06* (2013.01); *H04W 24/08* (2013.01); *H04W 24/02* (2013.01); *Y02B 60/50* (2013.01)

(58) Field of Classification Search
CPC ...... H04W 24/04; H04W 88/08; H04W 24/00; H04L 41/147; H04L 41/0681; H04L 12/2697
(Continued)

(56) References Cited

U.S. PATENT DOCUMENTS 5,991,629 A * 11/1999 Agrawal ........... H04W 52/0225
455/441
8,270,349 B2 * 9/2012 Fujimoto .......... H04W 56/0045
370/328
(Continued)

FOREIGN PATENT DOCUMENTS

| JP | 2000-293506 | 10/2000 |
| JP | 2009-118320 | 5/2009 |
| JP | 2013-110533 | 6/2013 |

OTHER PUBLICATIONS

Kwan, et al., "On Mobility Load Balancing for LTE Systems", Institute of Electrical & Electronic Engineers, Jul. 2010, 5 Pages.
(Continued)

*Primary Examiner* — Wayne Cai
*Assistant Examiner* — Julio Perez
(74) *Attorney, Agent, or Firm* — Tutunjian & Bitetto, P.C.; Vazken Alexanian (57) ABSTRACT

Optimization of mobile telecommunications service during a power outage at one or more base stations, wherein optimization includes identifying one or more of a plurality of base stations to which non-emergency electrical power has been interrupted; determining an initial number of users in areas corresponding to the one or more of the plurality of base stations; generating a user location probability model and a user call probability model; scheduling initial battery power operation for the plurality of base stations; monitoring user calls and user movement after the battery power operation has started; updating the user location probability model and the user call probability model based on the monitoring; and updating battery power operation scheduling for the plurality of base stations.

20 Claims, 6 Drawing Sheets

(51) Int. Cl.
*H04W 24/06* (2009.01)
*H04W 24/08* (2009.01)
*H04W 24/02* (2009.01)

(58) Field of Classification Search
USPC ............... 455/561, 522, 69, 574, 127.1, 572
See application file for complete search history.

(56) References Cited

U.S. PATENT DOCUMENTS

| | | | | |
|---|---|---|---|---|
| 8,310,103 | B2* | 11/2012 | Fischer | H02J 7/0019 |
| | | | | 307/66 |
| 8,489,154 | B2* | 7/2013 | Bishop | H04W 24/04 |
| | | | | 455/127.1 |
| 8,909,278 | B2* | 12/2014 | Rao | H04W 52/225 |
| | | | | 370/252 |
| 2012/0289224 | A1* | 11/2012 | Hallberg | H04W 52/223 |
| | | | | 455/424 |
| 2013/0051239 | A1* | 2/2013 | Meredith | H04W 16/18 |
| | | | | 370/241 |
| 2014/0073303 | A1* | 3/2014 | Henderson | H04W 24/02 |
| | | | | 455/418 |

OTHER PUBLICATIONS

Ali, et al., "Power-Controlled Rate and Coverage Adaption for WCDMA Cellular Networks" Institute of Electrical & Electronic Engineers, Jul. 2008, pp. 194-200.

\* cited by examiner

OPTIMIZATION OF MOBILE PHONE SERVICE DURING POWER FAILURE

BACKGROUND

1. Technical Field

The present invention relates to mobile phone service, and more particularly to optimizing mobile phone service during a power failure.

2. Description of the Related Art

In the event of a disaster, accident, breakdown of servers and/or base stations of a communication service company, or power failure at a telecommunications base station, mobile phone and other telecommunications services (e.g., e-mail, internet, etc.) may be stopped or limited because of the disaster, accident, breakdown of servers and/or base stations of a communication service company, or power failure at a telecommunications base station. Attempts to optimize mobile phone service during a power failure have been made by exchanging load information between adjacent base stations and by adjusting transmission power depending on the state of congestion of the network, but these techniques cannot perform long-term battery scheduling, and does not account for user movement or the usage rate of individual base stations after the power failure.

SUMMARY

A method for optimizing mobile telecommunications service during a power outage at one or more base stations, comprising identifying one or more of a plurality of base stations to which non-emergency electrical power has been interrupted; calculating an initial number of users in areas corresponding to the one or more of the plurality of base stations; generating a user location probability model and a user call probability model; scheduling initial battery power operation for the plurality of base stations; monitoring user calls and user movement after the battery power operation has started; updating the user location probability model and the user call probability model based on the monitoring; and updating battery power operation scheduling for the plurality of base stations.

A non-transitory computer readable storage medium comprising a computer readable program for optimizing mobile telecommunications service during a power outage at one or more base stations, wherein the computer readable program when executed on a computer causes the computer to perform the steps of identifying one or more of a plurality of base stations to which non-emergency electrical power has been interrupted; calculating an initial number of users in areas corresponding to the one or more of the plurality of base stations; generating a user location probability model and a user call probability model; scheduling initial battery power operation for the plurality of base stations; monitoring user calls and user movement after the battery power operation has started; updating the user location probability model and the user call probability model based on the monitoring; and updating battery power operation scheduling for the plurality of base stations.

A system for optimizing mobile telecommunications service during a power outage at one or more base stations, comprising an identification module configured to identify one or more of a plurality of base stations to which non-emergency electrical power has been interrupted; a user location prediction module configured to calculate an initial number of users in areas corresponding to the one or more of the plurality of base stations; one or more prediction modules configured to generate a user location probability model and a user call probability model; a battery scheduling module configured to schedule initial battery power operation for the plurality of base stations; a monitoring module configured to monitor user calls and user movement after the battery power operation has started; one or more updating modules configured to update the user location probability model and the user call probability model based on the monitoring; and a battery scheduling updating module configured to update battery power operation scheduling for the plurality of base stations.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention provide tools that can optimize mobile phone service in the event of a power outage at, for example, one or more communications base stations. The present principles may be employed to optimize mobile phone service during a power outage caused by any reason, including, for example, a natural disaster. The present embodiments may minimize average waiting time from an initial request for a call to the acceptance of the call for end users using one or more communications base stations for device connectivity, and thereby optimize mobile phone service in the event of a power outage.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 1:
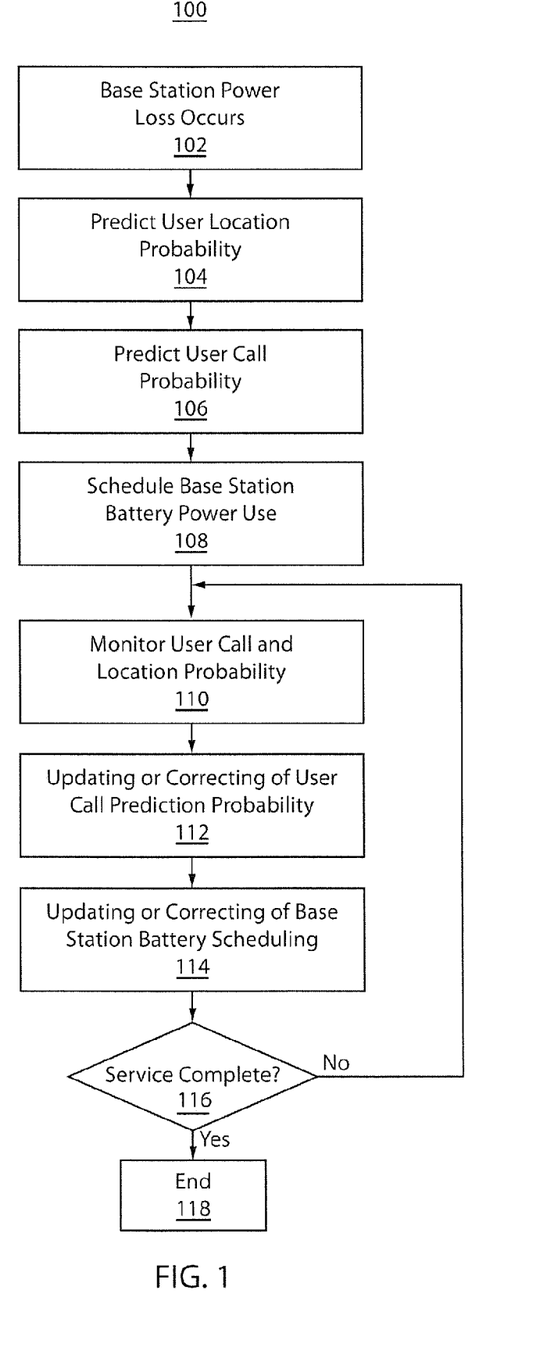
FIG. 1 is a block/flow diagram of a method for optimizing mobile phone service during a power failure in accordance with one illustrative embodiment of the present principles.

Referring now to the drawings in which like numerals represent the same or similar elements and initially to FIG. 1, a system and method for optimizing mobile phone service during a power failure 100 is illustratively shown in with one embodiment. In a particularly useful embodiment, in the event of a base station power loss because of, for example, a disaster, accident, etc., in block 102, information may be gathered regarding the number of users in one or more areas near one or more base stations, and an initial user movement may be predicted based on the location probability prediction of users in block 104.

The initial user location probability prediction 104 may be based on user movement models for similar disasters or similar accidents that have occurred in the past. For example, in the event of an earthquake, a model may be generated which includes models of user movement to an emergency evacuation area, random movement of users, no movement of users from an initial location, etc. based on similar past events. The probability of a user making a call may be determined in block 106, and base station battery scheduling may then be performed in block 108. During the initial battery scheduling in block 108, the amount of battery use of each base station may be allocated (e.g., on a pro-rata allocation basis) to various coverage areas. In one embodiment, for an area that is located at or around a border between service cells of a plurality of base stations, the nearest base station may be considered first during battery scheduling in block 108.

In one embodiment, each user may make a phone call at the probability of the probability model at the time of an incident causing a power failure at one or more base stations. It may be assumed that the probability of call acceptance by a base station is equal for every call in the case where plural call requests are addressed to the same base station, and users whose calls have failed may attempt to make the calls again. For example, a user may attempt to make a phone call until a connection is made, and the probability of the user making another attempt to complete a failed call may be determined in block 106. Furthermore, the probability of a user making another phone call may depend on the number of calls that particular user has made (e.g., the probability of making another call may decrease). The capacity per time slot of each base station may be predetermined, and when the battery of a base station is turned on, the base station may accept calls up to its capacity, and this may be combined with transmission power adjustment technology.

In another embodiment, in the case where the probability of user movement and the probability of a user call after the start of a service are monitored in block 110, a user movement model and a call probability model may be updated in block 112 based on the results of the monitoring in block 110. The base station battery scheduling may be updated or corrected in block 114 based on the updated or corrected user call prediction probability in block 112. If the service is complete 116 and optimized battery scheduling has been achieved, the monitoring of user call and location probability 110, updating or correcting of user call prediction probability, and updating or correcting of base station battery scheduling may end in block 118. If not, the monitoring of user call and location probability 110, updating or correcting of user call prediction probability, and updating or correcting of base station battery scheduling may be repeated until optimization has been achieved.

Figure 2:
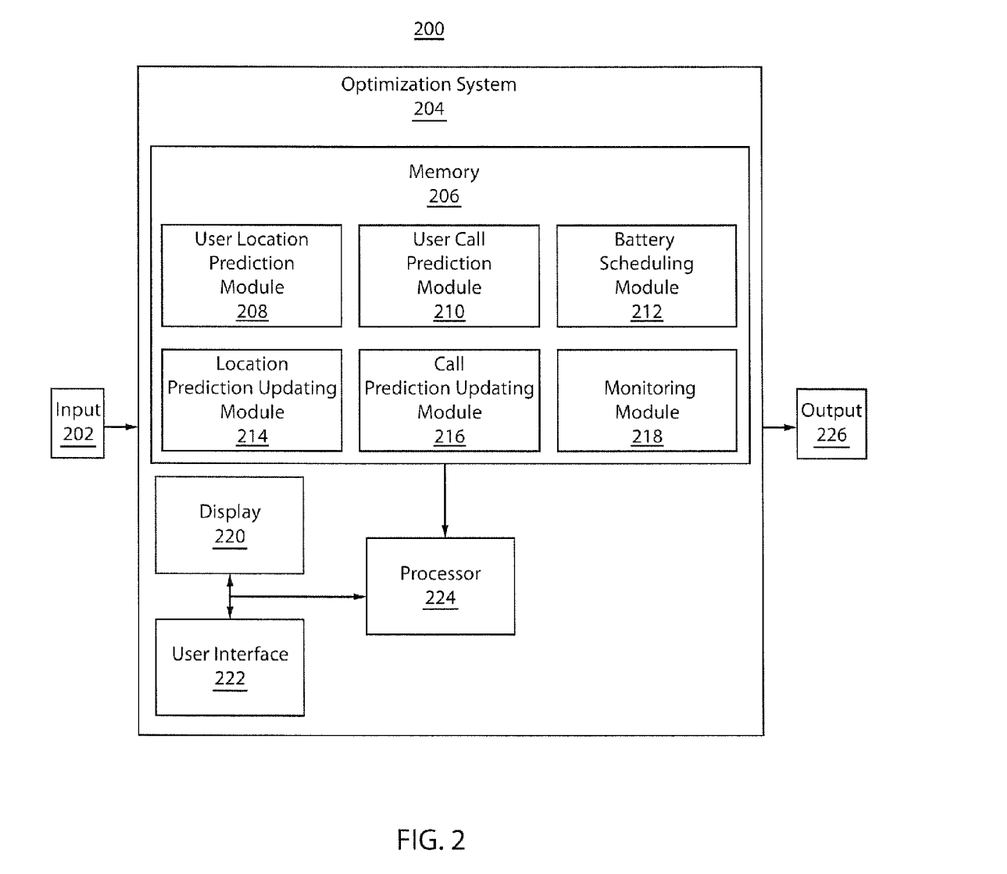
FIG. 2 is a block/flow diagram of a system for optimizing mobile phone service during a power failure in accordance with one illustrative embodiment of the present principles.

Referring now to FIG. 2, a system and method for optimizing mobile phone service during a power failure 200 is illustratively depicted in accordance with one embodiment. The system 200 may include an optimization system 204 which may receive input in block 202 and may generate output in block 226. The system 204 preferably includes one of more processors 224 and memory 206 for storing applications, modules, and other data. The system 204 may also include one or more displays 220 for viewing. The displays 220 may permit a user to interact with the system 204 and its components and functions. This may be further facilitated by a user interface 222, which may include a mouse, joystick, or any other peripheral or control to permit user interaction with the system 204 and/or its devices. It should be understood that the components and functions of the system 204 may be represented as one or more discrete systems or workstations, or may be integrated as part of a larger system or workstation, such as, for example, a large network of wirelessly connected cell phone base stations.

In one embodiment, the system 204 may include a user location prediction module 208 which may be employed to predict the initial location of one or more users. A user call prediction module 210 may be employed to determine the probability of a user making a call at a particular time and/or location. Initial battery scheduling may be performed by a battery scheduling module 212 to allocate (e.g., on a pro-rata allocation basis) the amount of battery use of each base station. In one embodiment, for an area that is located at or around a border between service cells of a plurality of base stations, the nearest base station may be considered first by the battery scheduling module 212.

A monitoring module 218 may monitor user call and location probability, and information obtained by the monitoring module 218 may be employed in the location prediction updating module 214 and the call prediction updating module 216 to update battery scheduling in the battery scheduling module 212. In one embodiment, the battery scheduling module schedules battery power for each base station in which a battery resource is limited based on the prediction of where users and their calls will be after a power outage as a result of, for example, a natural disaster.

In another embodiment, the scheduling of battery backup power may be calculated and implemented in advance of a predicted power outage from, for example, a natural disaster. For instance, a computer in a disaster support planning center or mobile company office may be employed to calculate the battery scheduling based on the information of remaining battery in each base station, user location, and call prediction results. A computer processor may be employed to predict user location and user calls probability, and may be implemented on a same computer as was employed to calculate battery power, or may be implemented on another system configured to do the predictions.

In a particularly useful embodiment, the present principles are employed to predict and monitor behavior such as user movement and user call probability in response to the occurrence of an event (e.g., earthquake, hurricane, etc.). Furthermore, the result of the monitoring may be fed back into the system to refine the prediction, and at least because of this monitoring and refining, long-term battery scheduling may be achieved. For example, if it is anticipated that people will gather at a certain base station cell area inside which an emergency evacuation center is located thirty (30) minutes after a particular event, the system 204 may perform scheduling for turning the battery of this base station on thirty (30) minutes after the occurrence of a disaster.

Figure 3:
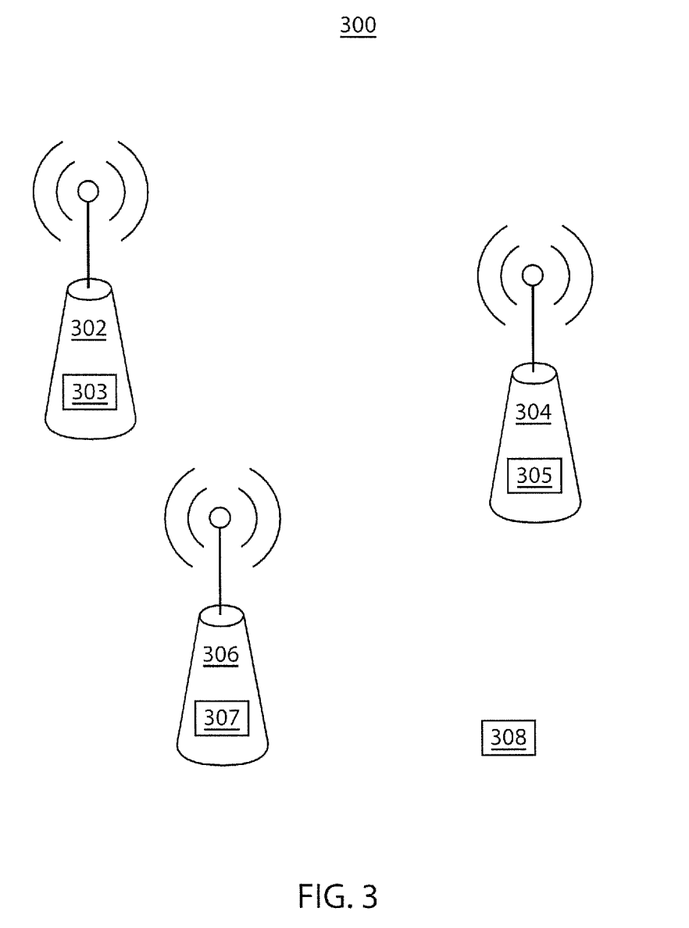
FIG. 3 is a block/flow diagram of an exemplary group of base stations with battery backup power in accordance with one illustrative embodiment of the present principles.

Referring now to FIG. 3, a block/flow diagram of an exemplary group of base stations with battery backup power 300 is illustratively depicted in accordance with one embodiment of the present principles. In one embodiment, there may be a plurality of base stations 302, 304, 306 which may have power failures because of, for example, a natural disaster. Each base station may include battery backup power 303, 305, 307, which may be controlled by the optimization system according to the present principles. A user 308 who makes a call after a power failure at one or more base stations may employ different base stations during the call based at least on the battery scheduling performed according to the present principles. It is noted that a 'user call' may include using the internet on a smartphone, tablet, laptop, etc., texting, or any other sort of communication method on any device that is now known, or will be known in the future, and is not limited to just a phone call using a cell phone.

Figure 4:
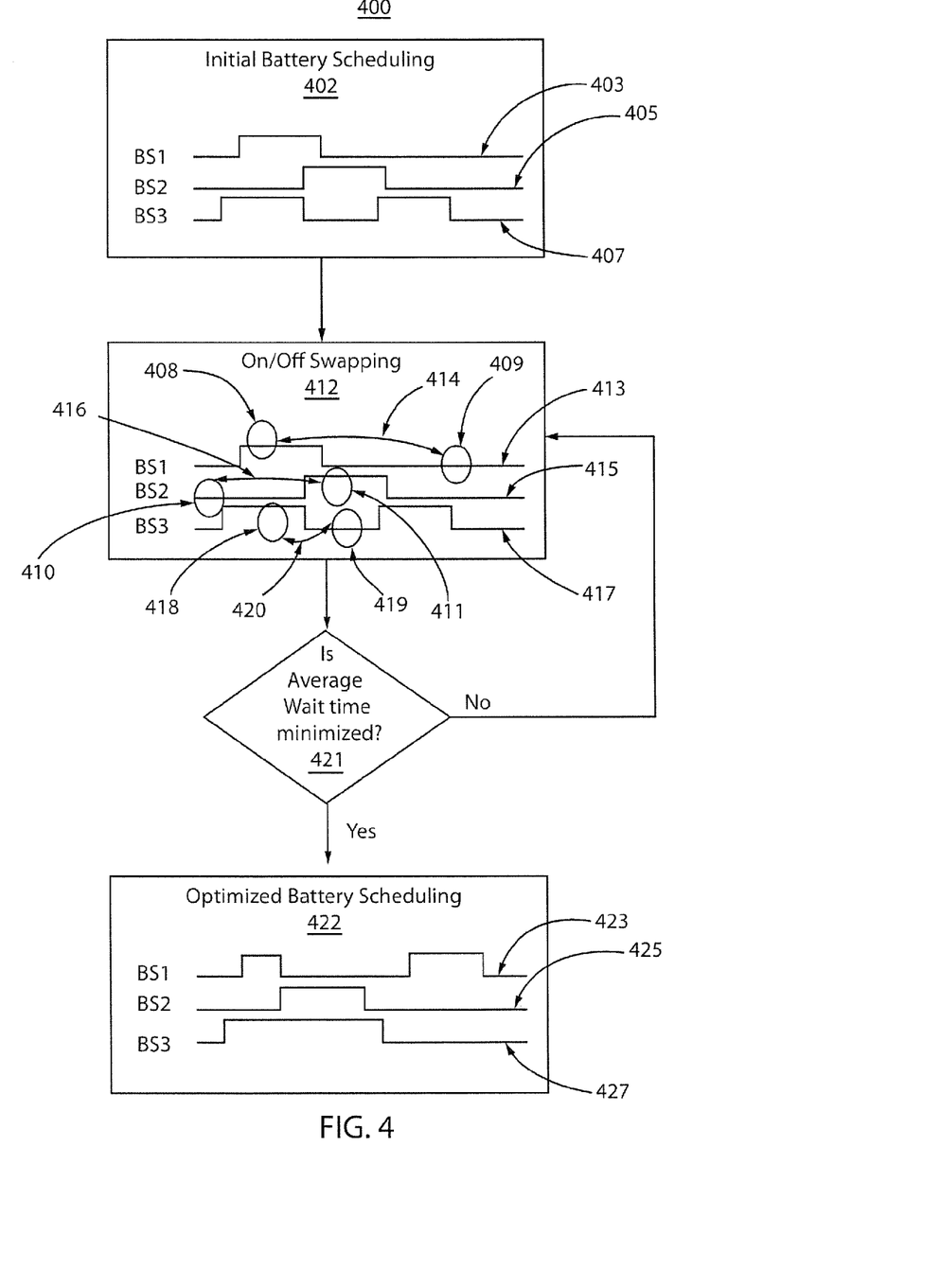
FIG. 4 is a block/flow diagram of a method for battery scheduling in base stations in accordance with one illustrative embodiment of the present principles.

Referring now to FIG. 4, a block/flow diagram of a system and method for battery scheduling in base stations 400 is illustratively depicted in accordance with one embodiment of the present principles. In one illustrative embodiment, initial battery scheduling is performed in block 402 for three different base stations (BS1, BS2, BS3), represented by 403, 405, and 407, respectively wherein the peaks represent battery power being ON in a particular base station and the valleys may represent battery power turned OFF at a particular base station. ON/OFF swapping may be performed in block 412 to minimize average wait time, and ON/OFF swapping is illustrated by the curves 413, 415, and 417 which correspond to the curves 403, 405, and 407, respectively.

ON/OFF swapping may be performed for each base station to minimize average wait time. For example, the battery power may be turned ON in block 408 and OFF in block 409, but this may be ON/OFF swapped 414 to minimize average wait time according to the present principles. Similar ON/OFF swapping may be employed for BS2 (where battery power may be turned OFF in block 410 and ON in block 411), and for BS3 (where battery power may be turned ON in block 418 and OFF in block 419), as depicted by the curves 415 and 417, respectively.

If the average wait time is determined to be minimized in block 421, then the optimized battery scheduling may be applied in block 422 to each of the three illustratively depicted base stations (BS1, BS2, BS3), and the ON/OFF scheduling curves 423, 425, 427 may indicate optimized battery scheduling for the base stations. It is noted that three base stations are shown for convenience for illustrative purposes, and any number of base stations and/or ON/OFF swapping attempts may be employed according to the present principles. A battery OFF time slot may represent the duration when a batter is off or not used, and may be calculated based on the battery scheduling. The optimized battery scheduling 422 may represent the final result of continuous swapping until the average wait time is determined to be minimized in block 421. The total duration of peaks and valleys signifying ON and OFF battery times may be unchanged after the swapping.

In a particularly useful embodiment, the below method may be employed to determine the average wait time (Twait_ave), and a goal may be to minimize Twait_ave:

$$N_{req\_in}(j, t) = \sum_{i=0}^{t} \alpha_i N_{req\_in}(j, t, i) \rightarrow \text{Service at } BS = j \rightarrow$$

$$N_{req\_out}(j, t) = \begin{cases} BS\_cap(j, t), & N_{req\_in}(j, t) \geq BS\_cap(j, t) \\ N_{req\_in}(j, t), & \text{otherwise} \end{cases}$$

Service requested $N_{req\_in}(j, t)$ Service requested $N_{req\_out}(j, t)$ $$N_{req\_in}(j, t, i) = \sum_{u=0}^{t} N_{req\_in}(j, t, i, u),$$

$$N_{req\_in}(j, t, i, u) = \sum_{k=1}^{N_B} p_{k \rightarrow j}(t)(\gamma_k(t-1) N_{req\_in}(k, t-1, i-1, u) + (1 - \gamma_k(t-1)) N_{req\_in}(k, t-1, i, u))), u < t$$

-continued $$N_{req\_in}(j, t, 0, t) = p_{call}(t)\left(N_{all}(j, t) - \sum_{i=1}^{t-1} N_{req\_in}(j, t, i)\right) / \alpha_0,$$

$$\gamma_j(t) = \frac{N_{req\_in}(j, t)}{N_{req\_out}(j, t)},$$

$$T_{wait\_total}(t) = \alpha_0 \sum_{j=1}^{N_b}\left(\gamma_j(t)\sum_{u=0}^{t}(t-u)N_{req\_in}(j, t, 0, u)\right),$$

$$T_{wait\_ave} = T_{int}\sum_{t=0}^{T_s} T_{wait\_total}(t) / \sum_{j=1}^{N_B}\sum_{i=0}^{T_s} N_{req\_in}(j, T_s, i)$$

The above variables may be defined as follows:

$N_{req\_in}(j,t,i,u)$: Total number at a point in time t by users who succeeded in call origination (i.e., making a call) i times in the past in the reception area of a base station j (hereinafter referred to as "area j") and who made the first call at a point in time u i<=u<=t.

$N_{req\_in}(j,t,i)$: Total number of call origination at the point in time t by users who succeeded in call origination i times in the past in the area j $N_{req\_in}(j,t)$: Total number of call origination (req_in) at the point in time t in the area j.

$\alpha_i$: Probability (%) of call origination by users who succeeded in call origination i times in the past.

$N_{req\_out}(j,t)$: Total number of call origination (req_out) at the point in time t in the area j.

BS_cap(j,t): Total number of calls that can be accepted at the point in time t in the area j.

$p_{k \rightarrow j}(t)$: Probability of movement from the area k to the area j during a time period between a point in time t−1 to the point in time t.

$\gamma_j(t)$: Percentage of the acceptance of a call request at the point in time t in the area j $p_{call}(t)$: Probability of making a call request at the point in time t by a user who has never originated a phone call.

$N_{all}(j,t)$: Total number of users at the point in time t in the area j.

$T_{int}$: Call acceptance service interval.

$N_b$: The number of base stations.

$T_{wait\_total}(t)$: Total waiting time for users who receive call service first time at the point in time t (In a case where call requests have not been accepted until the completion of a service, time from the initial request for the call service to the completion of the service is summed).

$T_{wait\_ave}$: Average time of waiting till receiving call service first time.

$T_S$: Number of times till the end of the service.

In one embodiment according to the present principles, ON/OFF timing of each base station may be scheduled to minimize Twait_ave by employing the above method. The end of service time may be predicted and employed to refine the optimization, and the residual battery power in each base station may be known. For example, the recovery time of a base station battery system (which may generally be two or three days after a disaster occurs) may be predicted, and this information may be employed to optimize the battery scheduling. Each of a plurality of base stations may employ ON/OFF scheduling independently of, or dependently on, the ON/OFF scheduling of other base stations. The battery scheduling at each base station may be such that each battery is scheduled to be exhausted of power at the end of the predicted service time if the battery in a particular base station does not have enough residual power to provide service continuously until the service ends.

For example, assuming that the battery residual of each base station and the time that the service (scheduling) ends are known, user movement after a disaster occurs may be predicted according to one embodiment of the present principles. Battery power may be initially allocated as ON in each base station in the time slot where more people are predicted to be located in the area that a particular base station covers. For example, if battery residual is 4 hours, and a minimum unit of battery ON/OFF change is one hour, ON may be set for time 3, 4, 8, and 9, and OFF may be set for time 0, 1, 2, 5, 6, and 7, as illustratively depicted in the below table (wherein "time 0" represents a duration between zero minutes and 59 minutes, "time 1" represents a duration between 1 hour and 1 hour, 59 minutes, etc., and "Number of People" represents the number of people attempting to use a particular base station):

| | Time (hours) | | | | | | | | | | |
|---|---|---|---|---|---|---|---|---|---|---|---|
| | 0 | 1 | 2 | 3 | 4 | 5 | 6 | 7 | 8 | 9 | 10 |
| Number of People | 5 | 16 | 20 | 30 | 21 | 15 | 18 | 19 | 40 | 45 | 15 |

The above allocation may not necessarily minimize the average waiting time (Twait_ave) for mobile phone service, and optimization and/or coordination with other base stations may be employed to minimize Twait_ave. For example, if people in time slot 5 have to wait until time slot 8, the ON/OFF timing may be swapped to reduce Twait_ave. All possible combinations of ON/OFF allocation may be attempted to find the ON/OFF combinations including all of the base stations that result in the least Twait_ave, but it is not necessary to attempt all combinations when employing the present principles.

For example, if the remaining battery in base station C is represented by x, and the duration until service is completed is represented by y (assuming y>=x), and a unit of the time slot is 1, there exists possible yCx scheduling. If there are n base stations, as many as $n\_comb = y\_1Cx\_1 * y\_2Cx\_2 * \ldots * y\_nCx\_n$ combinations (N_comb) are possible, where $x\_i$ and $y\_i$ represent x and y for base station i (BS i), respectively.

In one particularly useful embodiment, if the combination (N_comb) is very large, swapping of the ON and OFF slots for all combinations may be impractical, and ON/OFF swapping may be simulated to determine the best swapping pair which yields Twait_ave minimum according to the present principles. This simulating may be performed for each base station, and if ON/OFF swapping is determined to not make Twait_ave smaller in a particular instance, then ON/OFF swapping is not performed. If swapping makes Twait_ave larger or equal for all base stations, or if the procedure falls into a loop (e.g., swap an ON/OFF pair in base station 1, then swap an ON/OFF pair in base station 5, and this is continued in a loop), swapping may be stopped, and scheduling may be considered completed. The above method may be employed to determine how to schedule the battery (BS_cap(j,t)) in one or more base stations to minimize Twait_ave based on the call prediction and user location prediction modules.

While the above ON/OFF swapping method and battery scheduling is illustratively depicted according to the present principles, it is contemplated that other swapping methods and battery scheduling methods may also be employed according to the present principles.

Figure 5:
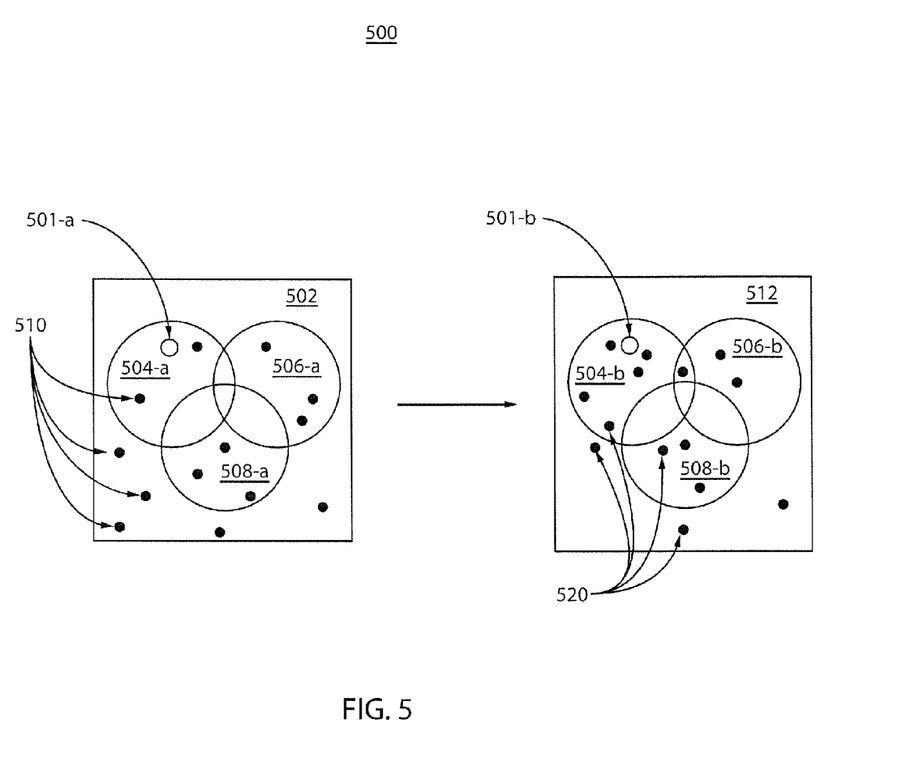
FIG. 5 is a block/flow diagram of a method for user location prediction in accordance with one illustrative embodiment of the present principles.

Referring now to FIG. 5, a block/flow diagram of a system and method for user location prediction 500 is illustratively depicted in accordance with one embodiment of the present principles. Individual user position 510 may be illustratively shown before the occurrence of a power loss, disaster, accident, etc. at one or more base stations in block 502. Blocks 504-a, 506-a, and 508-a represent base station coverage areas, and 501-a represents an evacuation area/center. Individual user position 520 may be illustratively shown after the occurrence of a power loss, disaster, accident, etc. at one or more base stations in block 512. Blocks 504-b, 506-b, and 508-b represent base station coverage areas, and 501-b represents an evacuation area/center, wherein blocks 504-b, 506-b, 508-b, and 512 correspond to blocks 504-a, 506-a, 508-a, and 502.

For example, it may be assumed that the number of users who are located in an area where it is possible to receive radio wave from base station i only is Xi. For an area where it is possible to receive radio waves from more than one base station, the nearest base station may be considered. In a situation where local mobile phone terminal exchange e-mails, etc., and put them together at the user side as a result of the processing of the service (e.g., call) of a particular user, it may be assumed that the e-mails of all users put together by that particular user have been processed. After the occurrence of a disaster, a probability of staying on the spot/scene without movement after an event (e.g., natural disaster, power outage, etc.), a probability of moving to an emergency evacuation area/center, and probability of a random walk may be determined according to the present principles. Furthermore, average speed of user movement to a base station and average speed of a random walk may also be considered when predicting user location according to the present principles.

Figure 6:
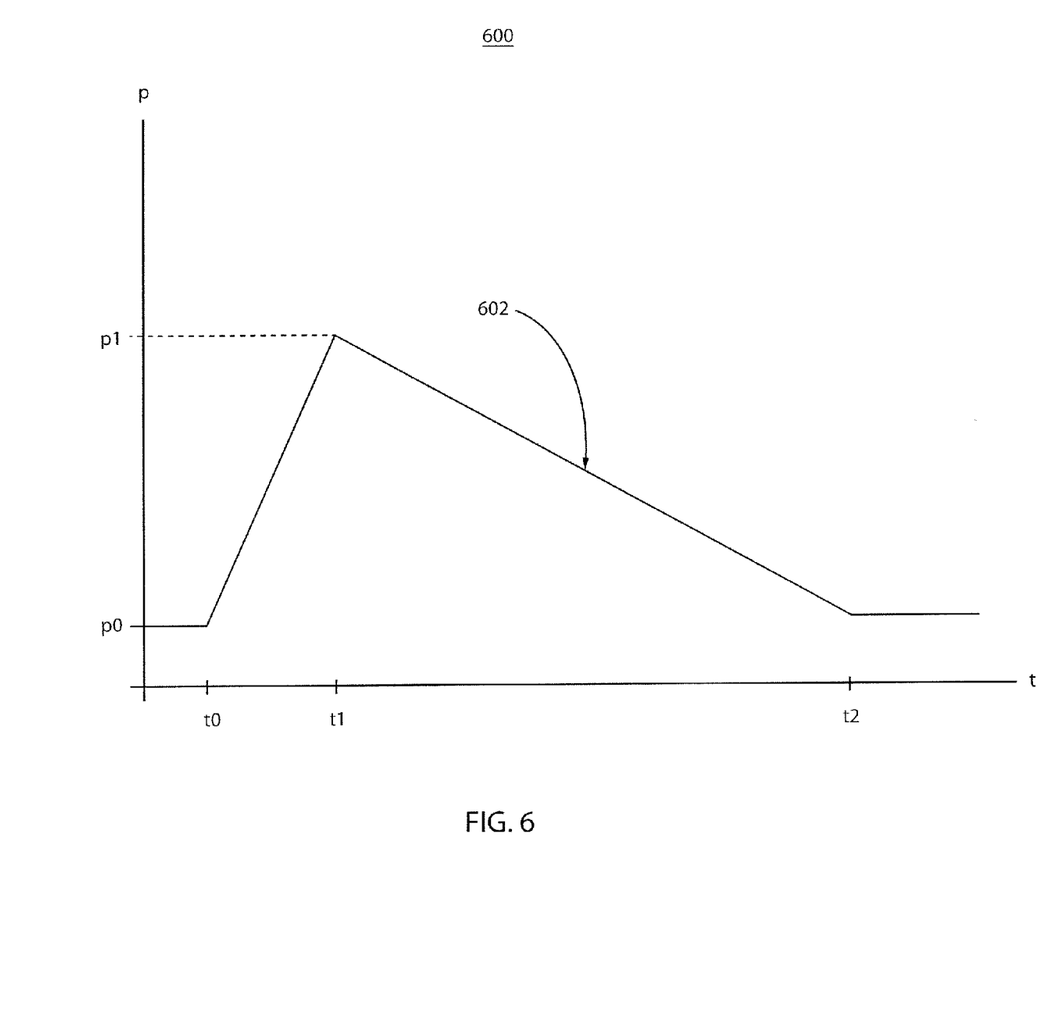
FIG. 6 is a block/flow diagram of a call probability model in accordance with one illustrative embodiment of the present principles.

Referring now to FIG. 6, a block/flow diagram of a call probability model 600 is illustratively depicted in accordance with one embodiment of the present principles. The probability of making a phone call (call origination) by an individual user during a unit time period and the probability for a case where the call is completed successfully with a single attempt (e.g., first attempt) to establish a call connection may be predicted according to the present principles. If the first attempt to establish a call connection is not successful, calling may be repeated at equal time intervals until a call connection is established. Once a call connection is established, in an i-th (where i is an ordinal number, and i>1) attempt for a call connection, calling may be performed at a percentage of $\alpha_{i-1}$ in relation to the first attempt for establishing a call connection.

The probability curve 602 may represent the probability of a particular user attempting to make a call or otherwise access a base station, where p0 represents the probability of making a call in non-disastrous conditions (before the occurrence of the disaster or after recovery from the disaster), 0 represents a point in time at which the disaster occurred, t0 represents a delay time period from the occurrence of the disaster to making a phone call, and t1 represents the call peak. The probability curve 602 may be determined by employing the below method:

$$p = \begin{cases} p_0, & 0 \leq t < t_0 \\ (p_1 - p_0)/(t_1 - t_0) * (t - t_0) + p_0, & t_0 \leq t < t_1 - \\ (p_1 - p_0)/(t_2 - t_1) * (t - t_1) + p_1, & t_0 \leq t < t_1 \\ p_0, & t_1 \leq t \end{cases}$$

Having described preferred embodiments of a system and method for optimization of mobile phone service during power failure (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for optimizing mobile telecommunications service during a power outage at one or more base stations, comprising:
    identifying one or more of a plurality of base stations to which non-emergency electrical power has been interrupted;
    determining an initial number of users in areas corresponding to the one or more of the plurality of base stations;
    generating a user location probability model and a user call probability model;
    scheduling initial battery power operation for the plurality of base stations;
    monitoring user calls and user movement after the battery power operation has started;
    updating the user location probability model and the user call probability model based on at least one of user call or user movement information obtained during the monitoring; and
    updating battery power operation scheduling for the plurality of base stations.

2. The method as recited in claim 1, wherein the scheduling includes scheduling initial battery power operation based on at least one of the initial number of users, the user location probability model, and the user call probability model.

3. The method as recited in claim 1, wherein the updating battery power operation scheduling includes updating battery power operation scheduling based on at least one of a current number of users, the updated user location probability model and the updated user call probability model.

4. The method as recited in claim 1, wherein the updated battery power operation scheduling includes updating the battery power operation scheduling to minimize the average wait time for a call connection.

5. The method as recited in claim 1, wherein the updated battery power operation scheduling includes updating the battery power operation scheduling to maximize the duration of battery power driven operation of the plurality of base stations.

6. The method as recited in claim 1, wherein the steps of monitoring of user calls and user movement, updating the user location probability model and the user call probability, and updating the battery power operation scheduling for the plurality of base stations are repeated until optimization has been achieved.

7. The method as recited in claim 1, wherein the scheduling includes scheduling initial battery power operation based on the initial number of users, the user location probability model, and the user call probability model.

8. A non-transitory computer readable storage medium comprising a computer readable program for optimizing mobile telecommunications service during a power outage at one or more base stations, wherein the computer readable program when executed on a computer causes the computer to perform the steps of:
    identifying one or more of a plurality of base stations to which non-emergency electrical power has been interrupted;
    calculating an initial number of users in areas corresponding to the one or more of the plurality of base stations;
    generating a user location probability model and a user call probability model;
    scheduling initial battery power operation for the plurality of base stations;
    monitoring user calls and user movement after the battery power operation has started;
    updating the user location probability model and the user call probability model based on at least one of user call or user movement information obtained during the monitoring; and
    updating battery power operation scheduling for the plurality of base stations.

9. The non-transitory computer readable storage medium comprising a computer readable program as recited in claim 8, wherein the scheduling includes scheduling initial battery power operation based on at least one of the initial number of users, the user location probability model, and the user call probability model.

10. The non-transitory computer readable storage medium comprising a computer readable program as recited in claim 8, wherein the updating battery power operation scheduling includes updating battery power operation scheduling based on at least one of a current number of users, the updated user location probability model and the updated user call probability model.

11. The non-transitory computer readable storage medium comprising a computer readable program as recited in claim 8, wherein the updated battery power operation scheduling includes updating the battery power operation scheduling to minimize the average wait time for a call connection.

12. The non-transitory computer readable storage medium comprising a computer readable program as recited in claim 8, wherein the updated battery power operation scheduling includes updating the battery power operation scheduling to maximize the duration of battery power driven operation of the plurality of base stations.

13. The non-transitory computer readable storage medium comprising a computer readable program as recited in claim 8, wherein the steps of monitoring of user calls and user movement, updating the user location probability model and the user call probability, and updating the battery power operation scheduling for the plurality of base stations are repeated until optimization has been achieved.

14. A system for optimizing mobile telecommunications service during a power outage at one or more base stations, comprising:
    an identification module configured to identify one or more of a plurality of base stations to which non-emergency electrical power has been interrupted;
    a user location prediction module configured to calculate an initial number of users in areas corresponding to the one or more of the plurality of base stations;
    one or more prediction modules configured to generate a user location probability model and a user call probability model;
    a battery scheduling module configured to schedule initial battery power operation for the plurality of base stations;

a monitoring module configured to monitor user calls and user movement after the battery power operation has started;

one or more updating modules configured to update the user location probability model and the user call probability model based on at least one of user call or user movement information obtained during the monitoring; and a battery scheduling updating module configured to update battery power operation scheduling for the plurality of base stations.

15. The system as recited in claim 14, wherein the scheduling initial battery power operation is based on at least one of the initial number of users, the user location probability model, and the user call probability model.

16. The system as recited in claim 14, wherein the updating battery power operation scheduling is based on at least one of a current number of users, the updated user location probability model and the updated user call probability model.

17. The system as recited in claim 14, wherein the updated battery power operation scheduling minimizes the average wait time for a call connection.

18. The system as recited in claim 14, wherein the updated battery power operation scheduling maximizes the duration of battery power driven operation of the plurality of stations.

19. The system as recited in claim 14, wherein the steps of monitoring of user calls and user movement, updating the user location probability model and the user call probability, and updating the battery power operation scheduling for the plurality of base stations are repeated until optimization has been achieved.

20. The system as recited in claim 14, wherein the scheduling initial battery power operation is based on the initial number of users, the user location probability model, and the user call probability model.

* * * * *